(12) United States Patent
Oakes et al.

(10) Patent No.: US 8,324,909 B2
(45) Date of Patent: Dec. 4, 2012

(54) VIDEO SIGNAL ANALYZER

(75) Inventors: Stephen Robert Oakes, San Jose, CA (US); Thomas Eugene Fusselman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1258 days.

(21) Appl. No.: 11/774,511

(22) Filed: Jul. 6, 2007

(65) Prior Publication Data

US 2009/0013372 A1 Jan. 8, 2009

(51) Int. Cl.
*H01H 31/02* (2006.01)
*H04N 17/00* (2006.01)
(52) U.S. Cl. ........................ 324/555; 348/180
(58) Field of Classification Search .................. 324/555; 348/180
See application file for complete search history.

(56) References Cited

U.S. PATENT DOCUMENTS

| 6,236,885 | B1 * | 5/2001 | Hunter et al. | 600/545 |
|---|---|---|---|---|
| 6,734,898 | B2 * | 5/2004 | Zeidler | 348/183 |
| 7,180,477 | B2 * | 2/2007 | Howell | 345/10 |
| 7,499,822 | B2 * | 3/2009 | Montreuil et al. | 702/117 |

* cited by examiner

*Primary Examiner* — Amy He
(74) *Attorney, Agent, or Firm* — Fletcher Yoder PC

(57) ABSTRACT

Methods, systems, and apparatus, including computer program products, for analyzing video signals. An apparatus includes a video interface operable to receive a video signal, a network interface operable to receive a test parameter from a network source, and a processor operable to couple to the video interface and the network interface and to perform a test on a video signal received from the video interface in accordance with the test parameter.

20 Claims, 4 Drawing Sheets

VIDEO SIGNAL ANALYZER

BACKGROUND

The subject matter of this specification relates generally to device testing.

Quality control is an important phase in product manufacturing. In factories or manufacturing sites, finished or semi-finished products are often inspected to determine whether the products are produced to meet a set of production requirements. In one example, testing of video devices (e.g., set-top boxes, video cards of computer devices, display cards of mobile phones, portable multimedia devices, video players of various video formats, etc.) includes testing of the video output of the video devices. Typically, the testing of a video device can be performed by connecting a display device (e.g., a monitor or a television (TV)) to a video device under test, and test personnel can observe the output as shown on the display device. The test personnel decide if the video device passes or fails the test based on a subjective evaluation of the output shown on the display device.

SUMMARY

In general, one aspect of the subject matter described in this specification can be embodied in an apparatus that includes a video interface operable to receive a video signal, a network interface operable to receive a test parameter from a network source, and a processor operable to couple to the video interface and the network interface and to perform a test on a video signal received from the video interface in accordance with the test parameter. Other embodiments of this aspect include corresponding systems, methods, and computer program products.

In general, another aspect of the subject matter described in this specification can be embodied in methods that include the actions of receiving a test parameter from a network source, receiving a video signal from a video interface, and performing a test on the video signal in accordance with the received test parameter. Other embodiments of this aspect include corresponding systems, apparatus, and computer program products.

Particular embodiments of the subject matter described in this specification can be implemented to realize one or more of the following advantages. Testing of video output signals can be performed using a portable testing device. Video output signals can be tested using objective tests and at lower cost. Communication of testing parameters to the testing device and of test results from the testing device can be done through a network. Testing parameters and tests can be changed on a project by project basis to account for changing requirements. The testing device can also be used as a video signal converter. The testing device can include internal real time data logging and statistical analysis capabilities as well as external capabilities, through a network interface. Both analog and digital video signals can be analyzed using the testing device. The testing device can be used to alert personnel of critical changes in test results during the production process.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
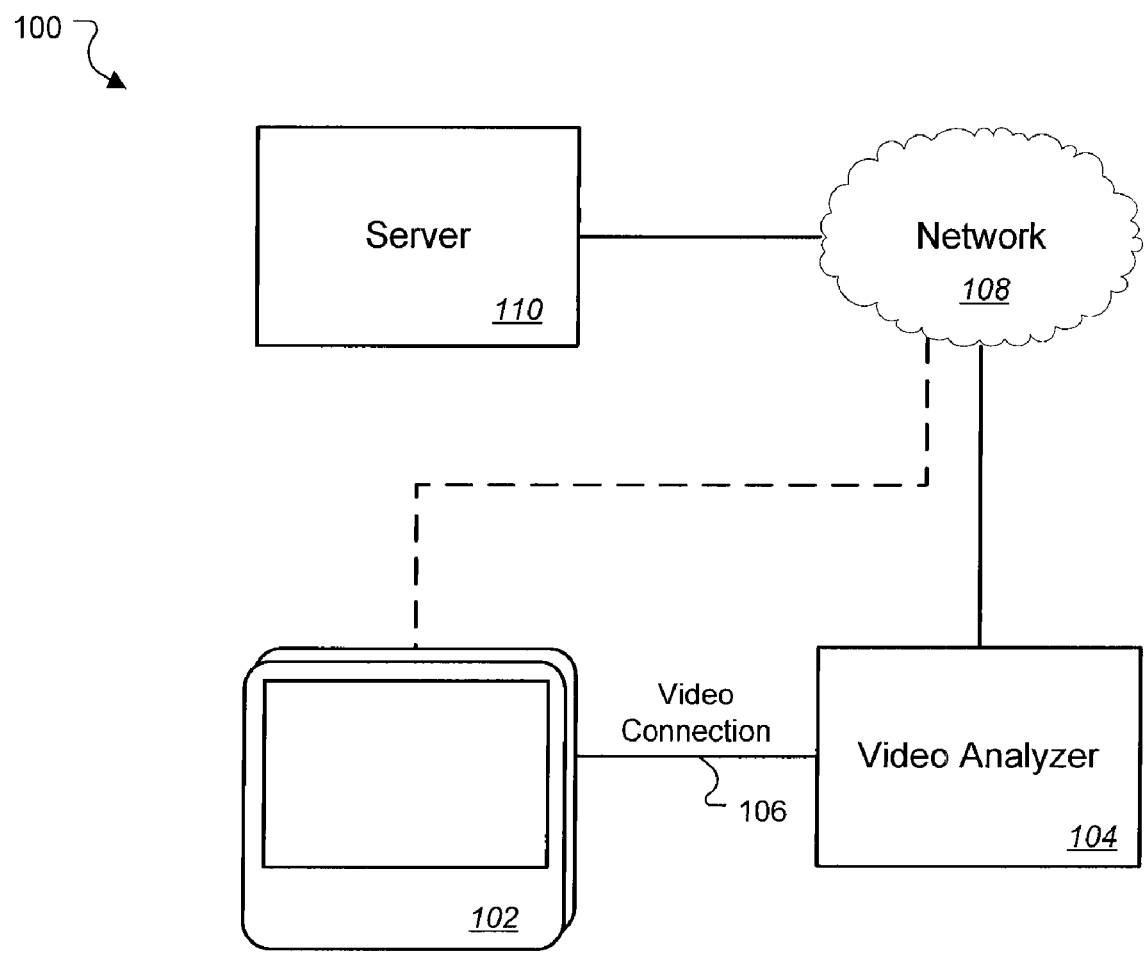
FIG. 1 is a block diagram illustrating an example system for testing video signals.

FIG. 1 shows an example system 100 for testing video signals. In FIG. 1, the system 100 includes a unit under test (UUT) 102 that is coupled to a video analyzer 104 through a video connection 106. In some implementations, the video analyzer 104 receives video signals from the UUT 102. The system 100 also includes a computer or other device (e.g., a server) 110. For convenience, the computer or device 110 will be referred as a "server." The system 100 also includes a network 108 for coupling these components. Examples of the network 108 include, without limitation, local area networks (LAN), wide area networks (WAN), Wi-Fi networks, wireless networks, and the Internet. In an example implementation, the network 108 is a LAN, where the video analyzer 104, and optionally the server 110 and the UUT 102 are each coupled to the network 108 using Ethernet. Other architectures are possible.

In some implementations, the video analyzer 104 can receive one or more test parameters from the server 110 through the network 108. For example, the test parameters may specify, among other things, tests to be performed on the video signals, test duration, test resolution, and pass or fail limits of the specified tests. Using the test parameters, the video analyzer 104 can test and validate the received video signals. In some other implementations, the video analyzer 104 can receive the test parameters from the UUT 102 through a direct connection (e.g., a direct connection between the video analyzer 104 and the UUT 102 that is out-of-band relative to the video connection 106, such as a serial connection, for example) or through the network 108.

In some further implementations, the video analyzer 104 is not communicatively coupled to the network 108 and has no connection to the UUT 102 other than the video connection 106; in this configuration, there is no communication between the server 110 and the video analyzer 104 and there is no communication between the video analyzer 104 and the UUT 102 other than the video signals to be tested. In these implementations, the video analyzer 104 can perform tests on video signals using test parameters that have been stored in the video analyzer (e.g., previously received parameters, default parameters that were pre-programmed at the time of manufacture).

In some implementations, the server 110 is a computer device that is located remotely or locally to the UUT 102 and the video analyzer 104. In an example implementation, the server 110 can be located close to the UUT 102 and the video analyzer 104. For example, the network 108 can be a LAN through which the server 110 can be connected to the UUT 102 and the video analyzer 104.

In another example implementation, the server 110 can be a remote server that is connected to the UUT 102 and the video analyzer 104 remotely through a network 108 that, for example, can be a wide area network (e.g., the Internet).

In some implementations, the server 110 transmits test parameters to the video analyzer 104 through the network 108. In some implementations, the video analyzer 104 can include an interface (e.g., an embedded web server with a website) for providing and changing test parameters and otherwise controlling operations of the video analyzer 104. By accessing the interface, the server 110 or a user can control operations of the video analyzer 104. In some implementations, the server 110 includes an application, process, module, or the like to transmit instructions and data to and receive data from the video analyzer 104 using any of a variety of communicative protocols (e.g., Transmission Control Protocol and Internet Protocol (TCP/IP), User Datagram Protocol (UDP), etc.). Further, in some implementations, the video analyzer 104 includes a user interface (e.g., a webpage) that an administrator can access (e.g., through a device communicatively coupled to the video analyzer 104 through the network 108) to adjust test parameters, view test results, and otherwise control operation of the video analyzer 104.

In some implementations, the video analyzer 104 includes a programmable logic device (e.g., a field programmable gate array (FPGA)) for performing the tests. The video analyzer 104 can receive source code written in a hardware description language (e.g., Verilog, VHSIC Hardware Description Language (VHDL) code) from the server 110. The source code can be used to configure (e.g., program) the programmable logic device of the video analyzer 104. For example, the source code can configure the video analyzer 104 to perform particular tests on video signals. In an example implementation, the source code can include a voltage limit and a test configuration for comparing voltage levels of the video signals to the voltage limit.

In some implementations, the server 110 can transmit control signals to the UUT 102. For example, the server 110 can instruct the UUT 102 to start or stop transmitting video signals to the video analyzer 104. In some implementations, the server 110 can also transmit test data (e.g., one or more test video files) to the UUT 102. For example, the UUT 102 can receive and store the test data received from the server 110. In this fashion, the server 110 can control the test data used for testing the UUT 102. For example, the server 110 can select the test data based on the output video format of the UUT 102, a previous test result of the UUT 102, statistics of test results of some previously tested UUT, and/or other user defined properties.

The server 110 can receive data from the UUT 102 and the video analyzer 104 through the network 108. In some implementations, the server 110 can receive test-related data from the video analyzer 104. For example, the server 110 can receive a test status, such as a message indicating a present test mode (e.g., a digital test mode or an analog test mode) from the video analyzer 104. In another example, the server 110 receives a test result, such as data indicating a passage or a failure of a test from the video analyzer 104. In another example, the server 110 receives parametric data from the video analyzer 104. For example, the parametric data can include a comparison between actual test results and expected results.

Although FIG. 1 shows one video analyzer and one UUT, in some implementations, the server 110 can simultaneously control more than one video analyzer to test more than one UUT. For example, the network 108 can be connected to more than one UUT and/or more than one video analyzer. Through the network 108, the server 110 can control operations of the connected video analyzers and the connected UUTs. In some implementations, the server 110 can also be connected to two or more networks. Through the networks, the server 110 can control operations of the video analyzers and UUTs that are connected to the networks.

In operation, the system 100 can be used to automate the testing of video signals outputted by the UUT 102. As an illustrative example, the server 110 can transmit a test parameter to the video analyzer 104. For example, the server 110 can transmit control signals to trigger the video analyzer 104 to begin verifying video signals from the UUT 102. For example, the server 110 can select tests to be performed by the video analyzer 104 to validate the captured video signals. For example, the server 110 can transmit pass or fail limits of the tests to the video analyzer 104. After performing the selected tests, for example, the video analyzer 104 transmits test results (e.g., test pass or test fail) to the server 110. In some implementations, the server 110 can determine an overall test result of the UUT 102 based on the received test results.

In some implementations, the video analyzer 104 is configured to receive more than one format of video signal. For example, the video analyzer 104 can verify video signals transmitted in a digital format and an analog format. In another example, the video analyzer 104 can validate digital video signals, such as video signals transmitted in a High Definition Multimedia Interface (HDMI) format or a Digital Visual Interface (DVI) format. In another example, the video analyzer 104 can validate analog signals, such as video signals transmitted in a coaxial format, composite video format, separate video (S-Video) format, a Syndicat des Constructeurs d'Appareils Radiorécepteurs et Téléviseurs (SCART) format, a component video format, or a video graphics array (VGA) format.

In some implementations, the test system 100 can include more than one video connection 106 to transmit different formats of video signals from the UUT 102 to the video analyzer 104. In some implementations, the video analyzer 104 can include more than one video input interface to receive video signals in the various formats. In some implementations, the video analyzer 104 can have an overloaded video input interface. That is, the video analyzer 104 can receive signals in multiple formats (one at a time) through the overloaded video input interface.

In some implementations, the video connection 106 can be made using one or more physical cables or some other physical connection. Depending on the number, types, and formats of signals, the cables include a variety of standard configurations, including but not limited to: video component cables, Bayonet Neill Concelman (BNC) connectors, coaxial cables, Video Graphics Array (VGA) connectors, RCA connectors, Sony/Philips Digital Interface (S/PDIF), Universal Serial Bus (USB), FireWire®, Ethernet cables, RJ45 connectors, phone jacks, Digital Video Interface (DVI), High-Definition Multimedia Interface (HDMI), etc. In some other implementations, the video connection 106 can be a wireless medium; the video signal can be transmitted or broadcast over the air, for example.

Based on the determined video format, the video analyzer 104 can select a test mode for testing the video data. For example, the test mode can include a set of tests to be performed and a set of test criteria. In one example, the video analyzer 104 performs digital tests, such as error checking, to validate digital video data. In one example, the video analyzer 104 performs analog tests, such as measuring voltage amplitude, to validate analog video signals. Some examples of test criteria are described with reference to FIG. 3.

In some implementations, the server 110 can transmit the test parameters that include a test mode (e.g., a HDMI/DVI test mode, a VGA/component test mode, a S-Video/composite test mode, etc.), a test duration, a test resolution, a test timing, and a set of pass or fail limits. In some implementations, the pass or fail limits can include 32-bit cyclic redundancy check (CRC32) values for HDMI and DVI tests. In some implementations, the pass or fail limits can include comparator low or high limits for VGA and component tests. In some implementations, the pass or fail limits can include comparator low or high limits, phase limits, frequency limits for composite and S-Video tests.

Figure 2:
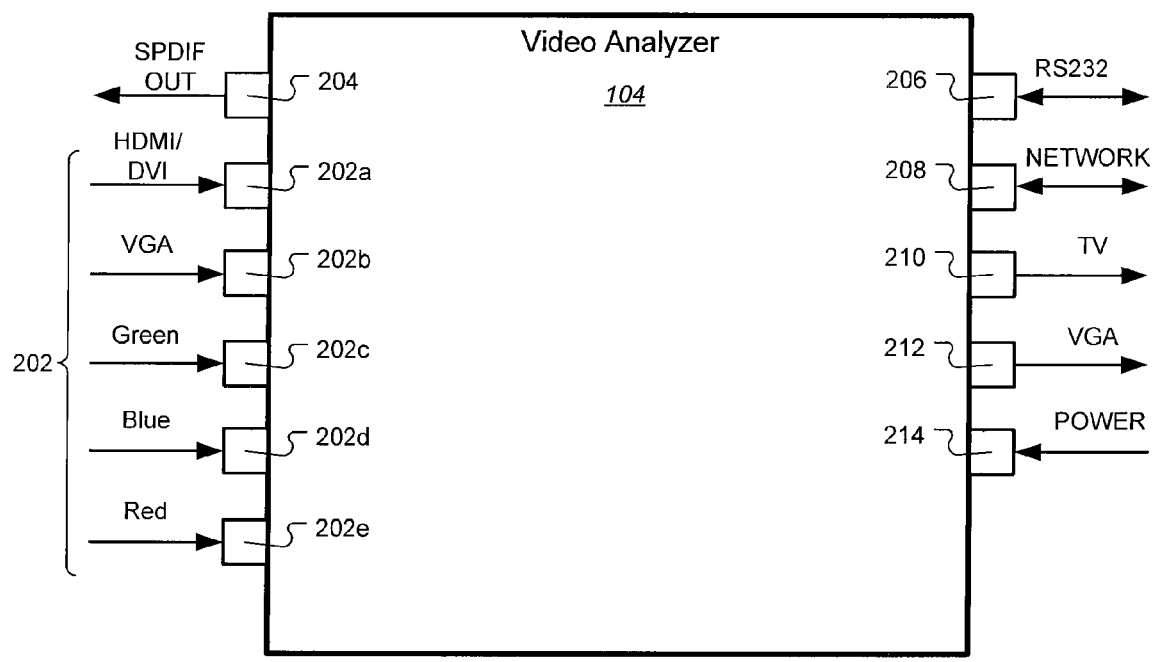
FIG. 2 is a schematic diagram illustrating a video analyzer for receiving video signals having different formats.

FIG. 2 shows an example of a video analyzer 104 that can receive video signals having different video signal formats. The video analyzer 104 can include various video inputs 202. The video inputs 202 can be used to receive video signals in analog or digital formats. In some implementations, the video analyzer 104 is configured to automatically capture video signals from the inputs 202.

The video inputs 202 includes a HDMI/DVI input 202a, a VGA input 202b, a green input 202c, a blue input 202d, and a red input 202e. In some implementations, the green, blue, and red inputs 202c, 202d, 202e can be used to receive component video signals, composite video signals, and/or S-Video video signals. For example, the video analyzer 104 can select a video signal format and activate hardware to receive video signals of the selected format using the inputs 202. In some implementations, the video analyzer 104 can test (e.g., a set of video format specific tests and a set of video format specific test requirements) the received video signals based on the selected video format.

In an example implementation, the green input 202c accepts a Y luma signal or a V color signal, the blue input 202d accepts a Pb color signal or a U color signal, and the red input 202e accepts a Pr color signal or a Composite Video Blanking and Sync (CVBS) composite video signal. The video analyzer 104 can discern the format of the received signal based on the combination of the green, blue, and red input 202c-e that is used. For example, if all three inputs 202c-e are used (i.e., has an incoming signal), then the incoming video signal is identified as a component signal (combination of Y and Pb and Pr signals). As another example, if only the red input 202e has an incoming signal, then the incoming signal is a composite video (CVBS) signal.

As shown in FIG. 2, in one implementation the video analyzer 104 includes a Sony/Philips Digital Interface Format (S/PDIF) output 204, a Recommended Standard 232 (RS232) interface 206, a network interface 208, a television (TV) output 210, a VGA output 212, and a power input 214. In some implementations, the TV output 210 can output a video signal in any of a variety of formats, including but not limited to component video, composite video, and S-Video.

In some implementations, the video analyzer 104 can separate audio signals from a signal that combines video and audio signals. For example, the video analyzer 104 separates HDMI embedded audio signal from a received HDMI signal. In this example, the video analyzer 104 outputs the separated audio signal to the S/PDIF output 204. In some implementations, the S/PDIF output 204 can be connected to an audio test device to validate the audio data. In some other implementations, the S/PDIF output 204 can be connected to an audio playback or decoding device for audio playback.

In FIG. 2, the video analyzer 104 can receive and transmit data through the RS232 interface 206 and/or the network interface 208. In some implementations, the video analyzer 104 can receive test parameters from server 110 using the network interface 208. In some implementations, the video analyzer 104 can transmit test results to the server 110 using the network interface 208.

Using the RS232 interface 206, the video analyzer 104 can communicate with an external device (e.g., a printer, a computer, a mobile computing device, or external user interface). In some implementations, the video analyzer 104 can receive control instructions and other data (e.g., test parameters) from the RS232 interface 206. For example, a device (e.g., a computer, a server) can be connected to the video analyzer 104 using the RS232 interface 206. In an example implementation, the computer can transmit control instructions (e.g., start test, stop test, reset, etc.) to the video analyzer 104. In another example, the computer can also transmit test code or parameters to the video analyzer 104. In some implementations, the video analyzer 104 can transmit data, such as test results, to the computer using the RS232 interface 206.

In some implementations, the video analyzer 104 generates VGA video output at the VGA output 212. In some implementations, a user can connect a VGA monitor to the VGA output 212 to observe the received video signals. Similarly, the user can connect a TV to the TV output 210 to observe the received video signals. In some implementations, the video output is a VGA signal regardless of the format of the video input signal; the video input signal is converted to VGA, if the input signal is not already a VGA signal. Accordingly, in some implementations, the video analyzer 104 can act as a video pass-through device, reducing or eliminating the need for acquiring different displays for different video formats.

The video analyzer 104 receives power for operations using the power input 214. In some implementations, the video analyzer 104 can receive DC power from the power input 214. For example, the video analyzer 104 can receive a 12V DC input power. In some other implementations, the power input 214 can receive AC power (e.g., AC main power). For example, the video analyzer 104 can include an AC-to-DC converter to rectify the received AC power. In some implementations, the video analyzer 104 can include one or more DC-to-DC converters to step-up or step-down the received DC power to supply various electronic components in the video analyzer 104.

Using the inputs 202, the video analyzer 104 can receive video signals having a HDMI format, a DVI format, a VGA format, a component format, a composite format, or a S-Video format. In some implementations, the video analyzer 104 can poll through each video input 202, one at a time, and test a video signal if acquired. For example, the video analyzer 104 can poll a first one of the inputs 202. If a video signal is found at that input, the video signal is tested. After completion of the test, or if no signal was found at that first input, the polling and testing process is repeated for a second input, and so forth. In some implementations, the video analyzer 104 can poll and test the video signals for each of the accepted video formats or until receiving an instruction to stop polling.

Figure 3:
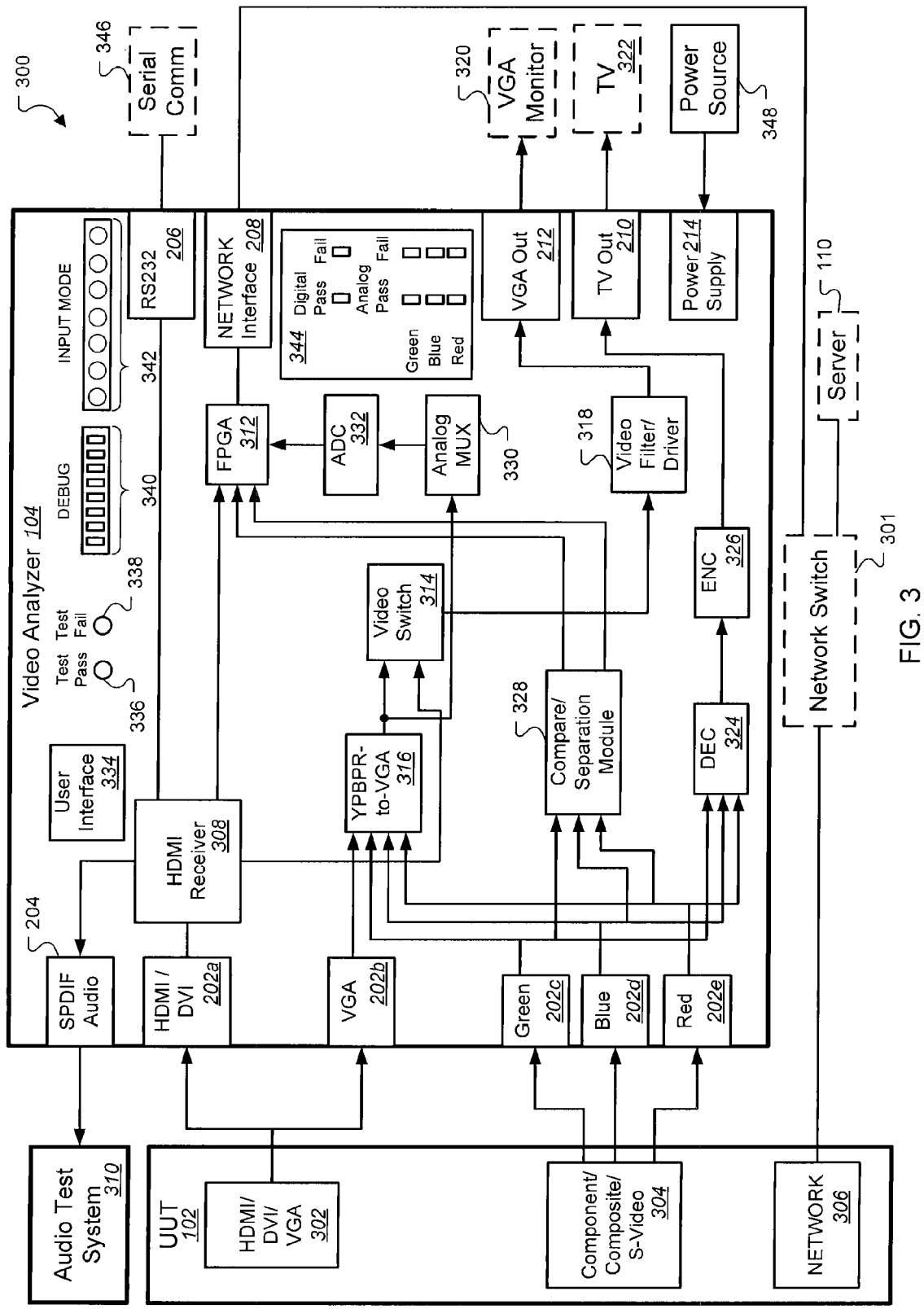
FIG. 3 is a block diagram illustrating an example test system that includes a video analyzer.

FIG. 3 shows an example test system 300 that includes the video analyzer 104 and the UUT 102. Test system 300 is an implementation of the system 100.

The UUT 102 can include a HDMI/DVI/VGA output 302, a component/composite/S-Video output 304, and a network interface 306. In some implementations, the UUT 102 transmits HDMI, DVI, or VGA signals using the output 302. In some implementations, the UUT 102 transmits component, composite, or S-Video signals using the output 304. The network interface 306 is configured to transmit and receive data from other computers or devices through a network. In some implementations, the network is a network that includes a network switch 301.

In the depicted example, the video analyzer 104 includes an HDMI receiver 308. The HDMI/DVI input 202a receives HDMI data from the UUT 102 and transmits the received data to the HDMI receiver 308. In some implementations, the HDMI receiver 308 separates the embedded audio data from the HDMI data and outputs the audio data using the SPDIF audio output 204.

The test system 300 includes an audio test system 310 to test the audio data from the SPDIF audio output 204. In some implementations, the audio test system 310 can include hardware, software, or both to verify the audio data. For example, the audio test system 310 can include digital signal processing (DSP) hardware or software (e.g., hardware or software to perform fast Fourier transform (FFT)) to analyze the audio data. In some implementations, the audio test system 310 can be integrated in the video analyzer 104.

The HDMI receiver 308 outputs video data to a field-programmable gate array (FPGA) 312 and a video switch 314. In some implementations, the FPGA 312 includes programmable logic to perform tests on video signals. For example, a user can use VHDL and Verilog programs to generate configuration definitions to program the FPGA 312. In some examples, the video analyzer 104 can receive the user-defined configuration definitions. After receiving the configuration definitions (e.g., through the network interface 208, the RS232 interface 206, or other communication interfaces), the video analyzer 104 programs the FPGA 312 according to the configuration definitions. In some implementations, the FPGA 312 is removable from the video analyzer 104 for repair or replacement. In some implementations, the FPGA 312 can also be manufactured to include pre-programmed tests and test parameters.

In some implementations, the video switch 314 receives video data from the HDMI receiver 308 and a YPbPr-to-VGA converter 316. In some implementations, the YPbPr-to-VGA converter 316 converts component video signals in the YPbPr video format to a VGA signals. In some implementations, the video switch 314 can be configured to pass through video signals from the HDMI receiver 308 or the YPbPr-to-VGA converter 316 to the video filter/driver 318. The video filter/driver 318 is connected to the VGA output 212. The video filter/driver 318 can transmit analog VGA signals from the video switch 314 to the VGA output 212. In some implementations, the video switch 314 can control a video output of the video analyzer 104 by selecting a video source from the HDMI receiver 308 or the YPbPr-to-VGA converter 316.

In an example implementation, the video filter/driver 318 can filter noise from the analog VGA signals. Using the VGA output 212, the video analyzer 104 can be used as a video converter to reduce or eliminate the cost of purchasing specific test equipment (e.g., high definition monitors for viewing test video data from a HDMI device). In some implementations, the video analyzer 104 can optionally be connected to a VGA monitor 320 using the VGA output 212. Using the VGA monitor 320, a user can view the video signals received from the UUT 102.

In some implementations, the user can view the received video signals by connecting a TV 322 (e.g., a standard definition TV or a high definition TV) to the TV output 210. In an example implementation, the TV output 210 outputs an analog signal (e.g., component video, composite video, S-Video) to the TV 322. In another example implementation, the TV output 210 outputs a digital signal (e.g., HDMI) to the TV 322. The video analyzer 104 includes a decoder 324 and an encoder 326 to generate TV video signals using video signals received from the red input 202c, the blue input 202d, and the green input 202e. For example, the decoder 324 can decode video signals (e.g., component video signals, composite video signals, or S-Video signals) received from the red, blue, and green inputs 202c-e. Using the decoded signals, the encoder 326 can encode a TV signal format to be transmitted to the TV 322.

The video analyzer 104 includes a compare/separation module 328 for converting composite or S-Video signals to component video signals and converting component or S-Video signals to composite signals. As shown, the compare/separation module 328 receives input from the inputs 202c-e. In some implementations, the compare/separation module 328 can include a comparator and a sync separator to convert video signals received from the inputs 202c-e to component video signals. In some implementations, the compare/separation module 328 can generate a comparator result and a separator result. Using the comparator result and the separator result, the FPGA 312 can validate the analog input video signals.

In some implementations, a composite signal or a S-Video signal is processed by the compare/separation module 328 before testing by the FPGA 312. The sync separator extracts timing syncs from the composite or S-Video signal, and the composite or S-Video signal is passed to the FPGA 312 in raw form.

In some implementations, an HDMI or DVI signal is converted to an 8:8:8 RGB digital signal before testing, and a component or S-Video signal is converted to an analog RGB signal before testing.

In some implementations, the video analyzer 104 includes an analog multiplexer (MUX) 330 and an analog-to-digital converter (ADC) 332. In some examples, the analog MUX 330 can select a channel of video signals received from the YPbPr-to-VGA converter 316. From the selected video signals, the ADC 332 can generate a digital representation of the digital data. For example, the ADC 332 can represent a voltage level of the analog signals as 12-bit digital data. As shown, the FPGA 312 receives the digital data from the ADC 332.

In some implementations, the video analyzer 104 includes a user interface 334, a test pass light emitting diode (LED) 336, a test fail LED 338, a set of debug LEDs 340, a set of input mode LEDs 342, and a set of test result LEDs 344. In some implementations, a user can use the user interface 334 to control operations of the video analyzer 104. For example, the user interface 334 can include a reset button, a capture button, and/or a set of mode switches for controlling operations in the video analyzer 104. In an example implementation, the user can use the reset button to reset operations in the video analyzer 104. In an example implementation, the video analyzer 104 can start capturing a video signal if the user selects the capture button. In an example implementation, the user can use the mode switches to select a preferred input mode (e.g., a HDMI mode, a VGA mode, a S-Video mode, etc.) for a present video test.

In some implementations, the video analyzer 104 provides visual feedback to the user using the various LEDs 336, 338, 340, 342, 344. For example, the video analyzer 104 can indicate a pass or a failure of a performed test using the test pass LED 334 and the test fail LED 336. In another example, the video analyzer 104 can show debug information using the debug LED 340. In a further example, the video analyzer 104 can be configured to turn on a certain combination of the LEDs 340 to represent a certain failure (e.g., a fault in the FPGA 312) in the video analyzer 104. In another example, the input mode LED 342 can indicate a present input mode of the video analyzer 104. For example, the input mode LED 342 can include a LED for each of the input mode (e.g., HDMI, DVI, S-video, VGA, composite, or component inputs). For example, the video analyzer 104 can turn on one or more of the input mode LEDs 342 to indicate that HDMI video data is being captured.

In the depicted example, the video analyzer 104 can also use the detailed test status LED 344 to display detailed test results. As shown, the video analyzer 104 can display a digital pass or a digital fail status for received video data. Additionally, the video analyzer 104 can use the LED 344 to show a pass or a fail for each of the analog inputs 202c-e. Accordingly, the user can determine which of the input interfaces failed.

The video analyzer 104 can also receive control signals and data using the network interface 208. As shown, the network interface 208 is connected to a network switch 301. As described in FIGS. 1-2, the video analyzer 104 can receive test parameters from a server 110 through the network 108. In some implementations, the FPGA 312 receives the test parameters through the network interface 208. For example, the FPGA 312 can use the received test parameters to validate video signals from UUT 102. In one example, the FPGA 312 can override default test parameters (e.g., CRC32 values, low/high voltage limit, phase limit, frequency limits, etc.) by the received test parameters. In another example, the FPGA 312 can select a preferred input mode based on the received test parameters. In another example, the FPGA 312 can configure test details (e.g., test duration, test resolution, etc.) based on the received test parameters.

In some implementations, the UUT 102 can transmit video data to the video analyzer 104 through the network switch 301 and the network interface 208. As shown, the network interface 208 is communicatively coupled to the FPGA 312. In one example, the FPGA 102 can receive the video data through the network interface 208 and use the received video data to validate the UUT 102. For example, the FPGA 312 can transmit test results to the server 110 using the network interface 208.

The test system 300 optionally includes a serial communication device 346 that is connected to the RS232 interface 206. In some implementations, the serial communication device 346 can receive data from or transmit data to the HDMI receiver 308. For example, the serial communication device 346 can receive video data to verify the operations of the HDMI receiver 308.

The test system 300 includes or is coupled to a power source 348. For example, the power source 348 can be an AC power source (e.g., an AC main power) or a DC power source (e.g., a battery). In some implementations, the power source 348 can be a power supply unit that combines AC power and DC power to supply substantially uninterrupted power.

In operation, the video analyzer 104 can be controlled locally using the user interface 334 or remotely through the network interface 208. In some implementations, the video analyzer 104 can receive operation instructions from the user interface 334. For example, the video analyzer 104 captures video data from the inputs 202a-e after a user selects a capture button of the user interface 334. In some implementations, the user interface 334 also includes dip switches or push buttons for the user to select an input format of the video data. For example, the user can use the user interface 334 to select the composite video format as a target input format of the present test. In some implementations, if the target input format is not specified, the video analyzer 104 can also poll the inputs 202a-e for valid video data. Some examples of polling methods of video data are described with reference to FIG. 4.

In some implementations, the video analyzer 104 tests the captured video data using the FPGA 312. In some examples, the FPGA 312 is configured to validate the video data based on the input mode. For example, the FPGA 312 can perform timing validation and/or frame-by-frame real time continuous CRC32 calculation if the input format is HDMI or DVI video. For example, the FPGA 312 can perform timing validation, analog red-green-blue (RGB) amplitude validation, and/or blanking region validation if the input format is VGA or component video. For example, the FPGA 312 can perform timing validation, phase calculation, subcarrier frequency validation, multiburst validation, differential gain validation, and/or color bar validation if the input format is composite or S-Video format. After performing at least one video test, the video analyzer 104 uses the LEDs 336, 338, 344 to indicate a pass or a fail of the performed at least one video test.

In some implementations, the FPGA 312 is programmed with various test procedures, logic for determining the test procedures to be used based on the input format and possibly other factors, and test limits for each of the test procedures. In some implementations, the FPGA 312 is preprogrammed at the time of manufacture. In some implementations, the FPGA 312 can be customized by the user. For example, the FPGA 312 can be programmed by an external device through the RS232 interface 206 or the network interface 208. Accordingly, the user can implement customized tests and/or test limits according to the user's requirements.

In some implementations, the video analyzer 104 can validate a video signal by executing instructions received from the server 110. For example, the video analyzer 104 can receive test parameters from the server 110 through the network switch 301. In some implementations, the server 110 can transmit the test parameters using TCP/IP communications. For example, the server 110 and the video analyzer 104 can communicate through a stand-alone TCP/IP application (e.g., a diagnostic software installed in the server 110). In some implementations, the video analyzer 104 includes an embedded web server with a website. Using the website, the server 110 can transmit the test parameters to the video analyzer 104. In some implementations, the video analyzer 104 can transmit a test result, such as a test pass, a test fail, and/or a detailed test status (e.g., a pass or a fail on the HDMI/DVI input 202a, a pass or a fail on each of the analog inputs 202c-e, values obtained during the tests,) to the server 110 through the network switch 301.

Figure 4:
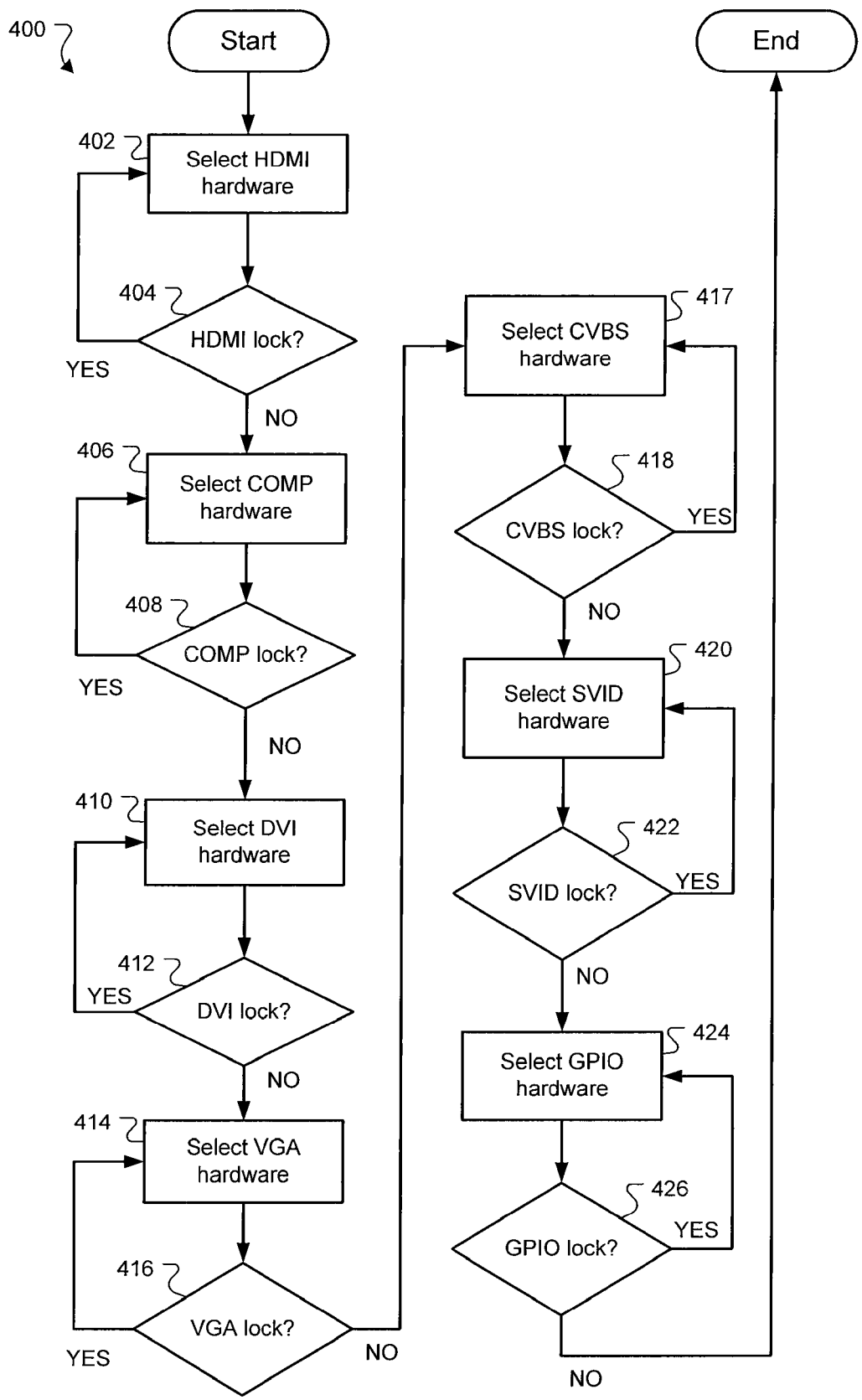
FIG. 4 is a flow diagram illustrating an example process for capturing active video signals.

FIG. 4 is a flow diagram illustrating a process 400, which is an example of processes that can be used for polling and capturing active video signals. For convenience, the process 400 will be described with reference to a video testing system (e.g., the video analyzer 104) that performs the process.

The system selects (e.g., initializes) HDMI hardware (402). For example, the video analyzer 104 selects to poll the HDMI input 202a for any incoming signal from a HDMI device. If the polling finds an incoming signal, the system locks on to that signal and initiates testing of that signal and all incoming signals from the HDMI device until there is no more incoming signal from the HDMI hardware.

If the system is locked onto a HDMI signal (404—yes), the system returns to block 402 and waits until the system is no longer locked onto a HDMI signal (e.g., when testing of the HDMI signal is complete, when the HDMI signal is lost).

If the system is not locked onto a HDMI signal (404—no), then the system selects a component video hardware (406). For example, the video analyzer 104 selects to poll the green input 202c, the blue input 202d, the red input 202e for a component video signal. If the polling finds an incoming signal, the system locks on to that signal and initiates testing of that signal and all incoming signals from the component video hardware until there is no more incoming signal from the component video hardware.

If the system is locked onto a component video signal (408—yes), the system returns to block 406 and waits until the system is no longer locked onto a component video signal (e.g., when testing of the component video signal is complete, when the component video signal is lost).

If the system is not locked onto a component signal (408—no), then the system selects DVI hardware (410). For example, the video analyzer 104 selects to poll the HDMI/DVI input 202a for a DVI signal. If the polling finds an incoming signal, the system locks on to that signal and initiates testing of that signal and all incoming signals from the DVI hardware until there is no more incoming signal from the DVI hardware.

If the system is locked onto a DVI signal (412—yes), the system returns to block 410 and waits until the system is no longer locked onto a DVI signal (e.g., when testing of the DVI signal is complete, when the DVI signal is lost).

If the system is not locked onto a DVI signal (412—no), then the system selects VGA hardware (414). For example, the video analyzer 104 selects to poll the VGA input 202b for a VGA signal. If the polling finds an incoming signal, the system locks on to that signal and initiates testing of that signal and all incoming signals from the VGA hardware until there is no more incoming signal from the VGA hardware.

If the system is locked onto a VGA signal (416—yes), the system returns to block 414 and waits until the system is no longer locked onto a VGA signal (e.g., when testing of the VGA signal is complete, when the VGA signal is lost).

If the system is not locked onto a VGA signal (416—no), then the system selects composite video (i.e., CVBS) hardware (417). For example, the video analyzer 104 selects to poll the red input 202e for a CVBS signal or poll the green, blue, and red inputs 202c, 202d, and 202e for a component or S-Video signal that can be converted down to a composite video signal. If the polling finds an incoming signal, the system locks on to that signal and initiates testing of that signal and all incoming signals from the CVBS hardware until there is no more incoming signal from the CVBS hardware.

If the system is locked onto a CVBS signal (418—yes), the system returns to block 417 and waits until the system is no longer locked onto a CVBS signal (e.g., when testing of the CVBS signal is complete, when the CVBS signal is lost).

If the system is not locked onto a CVBS signal (418—no), then the system selects S-Video hardware (420). For example, the video analyzer 104 selects to poll the green, blue, and red inputs 202c, 202e, and 202e for a S-Video signal or a component or composite video signal that can be converted to a S-Video signal. If the polling finds an incoming signal, the system locks on to that signal and initiates testing of that signal and all incoming signals from the S-Video hardware until there is no more incoming signal from the S-Video hardware.

If the system is locked onto a S-Video signal (422—yes), the system returns to block 420 and waits until the system is no longer locked onto a S-Video signal (e.g., when testing of the S-Video signal is complete, when the S-Video signal is lost).

If the system is not locked onto a S-Video signal (422—no), then the system selects general purpose input/output (GPIO) hardware (424). For example, the video analyzer 104 selects to poll a general purpose input/output interface, if the video analyzer has one. If the polling finds an incoming signal, the system locks on to that signal and initiates testing of that signal and all incoming signals from the GPIO hardware until there is no more incoming signal from the GPIO hardware.

If the system is locked onto a GPIO signal (426—yes), the system returns to block 424 and waits until the system is no longer locked onto a GPIO signal (e.g., when testing of the GPIO signal is complete, when the GPIO signal is lost).

If the system is not locked onto a GPIO signal (426—no), then the polling and signal capturing process can end.

It should be appreciated that the serial order in which the various inputs are polled and the respective video signals are tested, as shown in FIG. 4, are merely exemplary. The inputs can be polled, and their respective video signals can be tested, in an alternative serial order to the one shown in FIG. 4. Further, some or all of the inputs can be polled, and their respective video signals can be tested, in parallel.

In some implementations, the process 400 can be interrupted at some or all steps in the process 400. For example, a user can specify a target input mode using the user interface 334 or the network interface 208 during the execution of the process 400. Then, the video analyzer 104 may preempt any ongoing testing and check the specified target input for a signal.

In some implementations, the video analyzer 104 can be constructed to have a relatively portable size. In an example implementation, the video analyzer 104 can be less than 6 inches wide, less than 8 inches long, and less than 2 inches tall.

In some implementations, the UUT 102 can be a test head that is connected to an actual device under test. For example, the UUT 102 can be an interface between the device under test and the test system 100 or the test system 300. In some implementations, the UUT 102 can transmit a status of the device under test to the video analyzer 104 and/or the server 110. For example, the UUT 102 can transmit a signal to the video analyzer 104 to notify the video analyzer 104 and/or the server 110 that a device under test is ready to be tested. After receiving the notification, the video analyzer 104 can, for example, start polling for video signals from the inputs 202. As another example, the server 110 can transmit instructions to the video analyzer 104 and the UUT 102 to start video testing after receiving the notification.

In some implementations, the video analyzer 104 can include a controller. For example, the controller can be a microprocessor that controls various functions of the video analyzer 104. In some implementations, the controller can execute code stored in a memory (e.g., a random access memory (RAM), a read-only memory (ROM), a flash memory, a hard disk drive). In some implementations, the controller can control the operations of the video analyzer 104 using the code stored in the memory. For example, the controller can control the HDMI receiver 308 and the FPGA 312 to validate video signals. In some implementations, the controller can perform instructions received from the server 110. In some implementations, the controller can execute software customized by the user. For example, the controller can execute software that includes user-defined tests and use user-defined test parameters to validate the video analyzer 104.

In some implementations, the video analyzer 104 can also include other network interfaces. For example, the video analyzer 104 can include a wireless network interface (e.g., a wireless local area network (WLAN) interface). For example, the video analyzer 104 can use the wireless network interface to receive wireless data from the network 108. In some examples, the video analyzer 104 can also include a universal serial bus (USB) interface or a FireWire interface to receive data and/or power.

In some implementations, a single video analyzer 104 can be used across several UUT's 102 on the same network. In these implementations, the video analyzer 104 is paired with a UUT 102. The UUT 102 obtains the Media Access Control (MAC) address of the video analyzer 104. The UUT 102 can use the MAC address to assign an IP address to the video analyzer 104 to enable subsequent communication activities and proper pairing. In other words, the UUT 102 can automatically pair with the video analyzer 104.

In an example implementation, a UUT 102 and a video analyzer 104 are connected directly with an Ethernet cable and a video connection 106, and other devices (e.g., server 110) are optional. The Ethernet connection provides a communications path through which the UUT 102 can control the video analyzer 104, and the video connection 106 provides a path through which the video signals to be tested are transmitted. In another example implementation, the Ethernet connection provides a communication path through which the UUT 102 can be controlled. For example, the video analyzer 102 or a remote computer, through the video analyzer 104, can control the UUT 102.

In some implementations, the video analyzer 104 supports various networking protocols and technologies, including but not limited to server-side or client-side Dynamic Host Configuration Protocol (DHCP), TCP, UDP, File Transfer Protocol (FTP), Hypertext Transfer Protocol (HTTP), Simple Mail Transfer Protocol (SMTP), etc. In an example implementation, the video analyzer 104 can detect a DHCP server in the network 108 or coupled to the network 108, and in response, automatically enter a DHCP client mode. If no DHCP server is detected, the video analyzer 104 can enter a DHCP server mode. In some implementations, the video analyzer 104 is capable of automatically configuring a network (e.g., configuring the network settings) between itself and other devices (e.g., UUT 102, server 110, etc.).

While this specification contains many specifics, these should not be construed as limitations on the scope of what is being claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims.

What is claimed is:

1. An apparatus comprising:
   a video interface operable to receive a video signal having one of a plurality of video signal formats;
   a network interface operable to receive a test parameter from a network source; and
   a processor operable to couple to the video interface and the network interface, to determine the received video signal format, determine the test parameter depending on the determined video signal format, and to perform a test on a video signal received from the video interface in accordance with the test parameter.

2. The apparatus of claim 1, where the video interface is operable to receive video signals having different video signal formats.

3. The apparatus of claim 1, comprising a plurality of video interfaces operable to receive respective video signals; and wherein the processor is further operable to:
   poll a first one of the plurality of video interfaces;
   perform a test on a first video signal received from the first one of the plurality of video interfaces if any;
   and if none, poll a second one of the plurality of video interfaces; and
   perform a test on a second video signal received from the second one of the plurality of video interfaces.

4. The apparatus of claim 1, further comprising:
   a combined video and audio interface operable to receive a combined video and audio signal; and
   an audio interface operable to output an audio signal separated from the combined video and audio signal.

5. The apparatus of claim 4, wherein the combined video and audio interface comprises a High-Definition Multimedia Interface (HDMI) interface.

6. The apparatus of claim 1, further comprising an output video interface operable to output a video signal.

7. The apparatus of claim 6, wherein:
   the output video signal is derived from the received video signal and is in a different format than the received video signal.

8. The apparatus of claim 6, wherein the output video interface comprises a Video Graphics Array (VGA) interface.

9. The apparatus of claim 1, wherein the video interface comprises one of the group consisting of: a VGA interface, a component video interface, a S-video interface, a composite video interface, and a Digital Visual Interface (DVI) interface.

10. The apparatus of claim 1, wherein the processor comprises a programmable logic device.

11. The apparatus of claim 1, wherein the test comprises at least one of the group consisting of: timing validation, cyclic redundancy check calculation, analog red-green-blue (RGB) amplitude validation, blanking region validation, phase calculation, subcarrier frequency validation, multiburst validation, differential gain validation, and color bar validation.

12. The apparatus of claim 1, wherein the processor is further operable to transmit a result of the test to the network source through the network interface.

13. The apparatus of claim 1, further comprising one or more indicators operable to give visual feedback of a result of the test.

14. A method, comprising:
   receiving a video signal from a video interface;
   determining a video signal format of the received video signal from among a plurality of video signal formats;
   receiving a test parameter depending on the determined video signal format; and
   performing a test on the video signal in accordance with the received test parameter.

15. The method of claim 14, wherein determining a video signal format and performing a test on the video signal include:
  polling a first one of a plurality of video input interfaces;
  receiving a first video signal from the first one of the video input interfaces;
  performing a test on the first video signal;
  polling a second one of the video input interfaces;
  receiving a second video signal from the second one of the video input interfaces; and
  performing the test on the second video signal.

16. The method of claim 14, further comprising outputting the video signal.

17. The method of claim 16, wherein outputting the video signal comprises:
  converting the video signal from a first format into a second format; and
  outputting the video signal in the second format.

18. The method of claim 14, further comprising:
  receiving a combined video and audio signal;
  separating the combined video and audio signal into a video signal and audio signal; and
  performing a test on the video signal.

19. The method of claim 18, further comprising outputting the audio signal.

20. The method of claim 14, further comprising transmitting a result of the test to the network source.

* * * * *